United States Patent
Park et al.

(10) Patent No.: US 12,230,444 B2
(45) Date of Patent: Feb. 18, 2025

(54) DIELECTRIC MATERIAL, DEVICE INCLUDING THE SAME, AND METHOD OF PREPARING THE DIELECTRIC MATERIAL

(71) Applicant: Samsung Electronics Co., Ltd., Suwon-si (KR)

(72) Inventors: Hyeon Cheol Park, Hwaseong-si (KR); Daejin Yang, Seoul (KR); Doh Won Jung, Seoul (KR); Taewon Jeong, Yongin-si (KR); Giyoung Jo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 309 days.

(21) Appl. No.: 17/858,552

(22) Filed: Jul. 6, 2022

(65) Prior Publication Data

US 2023/0154679 A1    May 18, 2023

(30) Foreign Application Priority Data

Sep. 13, 2021 (KR) .......... 10-2021-0122077

(51) Int. Cl.
*H01G 4/10* (2006.01)
*C01G 33/00* (2006.01)
*H01G 4/30* (2006.01)

(52) U.S. Cl.
CPC ............ *H01G 4/10* (2013.01); *C01G 33/006* (2013.01); *H01G 4/30* (2013.01); *C01P 2002/34* (2013.01); *C01P 2002/54* (2013.01); *C01P 2002/72* (2013.01); *C01P 2006/32* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 7,323,806 B2* | 1/2008 | Shibata | H10N 30/8542 347/68 |
| 7,838,453 B2* | 11/2010 | Katayama | H10N 30/097 252/62.9 PZ |
| 8,791,625 B2* | 7/2014 | Kounga Njiwa | C04B 35/4682 252/62.9 PZ |
| 9,576,730 B2* | 2/2017 | Park | C04B 35/638 |

(Continued)

FOREIGN PATENT DOCUMENTS

| | | | |
|---|---|---|---|
| JP | 2003252681 A | * 9/2003 | |
| WO | WO-2021229919 A1 | * 11/2021 | B32B 18/00 |

OTHER PUBLICATIONS

Translation (Year: 2003).*

(Continued)

*Primary Examiner* — Dion R. Ferguson
(74) *Attorney, Agent, or Firm* — Harness, Dickey & Pierce, P.L.C.

(57) ABSTRACT

Provided are a dielectric, a device including the same, and a method of preparing the dielectric. The dielectric material includes a $NaNbO_3$ ternary material including a perovskite phase with a Sm element substituted into a Na site such that the $NaNbO_3$ ternary material has a permittivity of 600 or more at 1 kHz, and a temperature coefficient of capacitance (TCC) of about −15% to about 15% in a range of about −55° C. to about +200° C.

26 Claims, 11 Drawing Sheets

(56) References Cited

U.S. PATENT DOCUMENTS

| | | | |
|---|---|---|---|
| 9,824,819 B2* | 11/2017 | Yoon | C04B 35/62685 |
| 10,844,516 B2* | 11/2020 | Fratello | C30B 11/14 |
| 2003/0134738 A1* | 7/2003 | Furukawa | C04B 35/462 |
| | | | 501/137 |
| 2009/0207555 A1* | 8/2009 | Hackenberger | C04B 35/493 |
| | | | 29/25.42 |
| 2012/0098386 A1* | 4/2012 | Kounga Njiwa | C04B 35/475 |
| | | | 361/321.5 |
| 2016/0163457 A1* | 6/2016 | Yoon | C04B 35/62685 |
| | | | 501/137 |
| 2023/0154679 A1* | 5/2023 | Park | H01G 4/1218 |
| | | | 361/301.4 |

OTHER PUBLICATIONS

Translation (Year: 2012).*
R. Wayne Johnson et al., "The Changing Automotive environment: High-Temperature electronics," IEEE Transactions On Electronics Packaging Manufacturing, vol. 27, No. 3, Jul. 2004.
K. Kobayashi et al., "Novel High-Temperature Antiferroelectric-Based Dielectric NaNbO3—NaTaO3 Solid Solutions Processed in Low Oxygen Partial Pressures," Journal of the American Ceramic Society, vol. 96, No. 2, Feb. 2013, pp. 531-537.
J. Koenig et al., "New Na0.5Bi0.5Tio3—NaTaO3-Based Perovskite Ceramics," Journal of the American Ceramic Society, vol. 90, No. 11, Nov. 2007, pp. 3621-3627.

* cited by examiner

DIELECTRIC MATERIAL, DEVICE INCLUDING THE SAME, AND METHOD OF PREPARING THE DIELECTRIC MATERIAL

CROSS-REFERENCE TO RELATED APPLICATION

This application is based on and claims priority under 35 U.S.C. § 119 to Korean Patent Application No. 10-2021-0122077, filed on Sep. 13, 2021, in the Korean Intellectual Property Office, the disclosure of which is incorporated by reference herein in its entirety.

BACKGROUND

1. Field

The present disclosure relates to a dielectric material, a device including the same, and a method of preparing the dielectric material.

2. Description of the Related Art

In accordance with the continuing demand for miniaturization and higher capacity of electronic products, capacitors having a smaller size and higher capacity are needed. In order to implement capacitors having a smaller size and higher capacity, there is a need for dielectric materials that can provide further improved dielectric properties.

To manufacture a multi-layered ceramic capacitor (MLCC), which is a type of small-size, high-capacity capacitor, dielectric layers need to be made thin. This inevitably induces a rapid increase in an electric field, which leads to a reduction in spontaneous polarization of dielectrics, and consequently, a remarkable drop in permittivity. In addition, the need for a high-temperature dielectric material for use in MLCC for vehicles and/or special purposes is gradually increasing. However, there still is a need for a dielectric material that satisfies both high permittivity (400 or larger) and high specific resistivity ($>1\times10^{12}$ $\Omega$cm) and is also stable at high temperatures.

SUMMARY

One or more embodiments provide a dielectric material that has high permittivity and specific resistivity and is also stable at high temperatures.

One or more embodiments provide a device including the dielectric material.

One or more embodiments provide a method of preparing the dielectric material.

Additional aspects will be set forth in part in the description which follows and, in part, will be apparent from the description, or may be learned by practice of the presented embodiments of the disclosure.

According to one or more embodiments, provided is a dielectric material including a $NaNbO_3$ ternary material including a perovskite phase with a Sm element substituted into a Na site such that the $NaNbO_3$ ternary material has a permittivity of 600 or more at 1 kHz, and a temperature coefficient of capacitance (TCC) of about −15% to about 15% in a range of about −55° C. to about +200° C.

According to one or more embodiments, provided is a device including: a first electrode; a second electrode facing the first electrode; and a dielectric layer between the first electrode and the second electrode, wherein the dielectric layer includes the dielectric material described above.

According to one or more embodiments, provided is a method of preparing a dielectric material, the method including: mechanically milling a mixture of a Nb compound, a Na salt, a Sm compound, an M1-containing salt, and an M2-containing salt; and performing a first heat treatment in an oxidizing atmosphere such that the mixture oxidizes to form the dielectric material including a compound represented by Formula 1

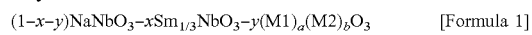   [Formula 1]

wherein, M1 is a Group 1 element, a Group 2 element, or a Group 15 element of the Periodic Table of the Elements, or a combination thereof, M2 is a Group 4 transition metal element a Group 5 transition metal element, or a combination thereof, and $0.1 \le x \le 0.15$, $0.001 \le y \le 0.1$, $0<a<1$, $0<b<1$, and $a+b=1$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
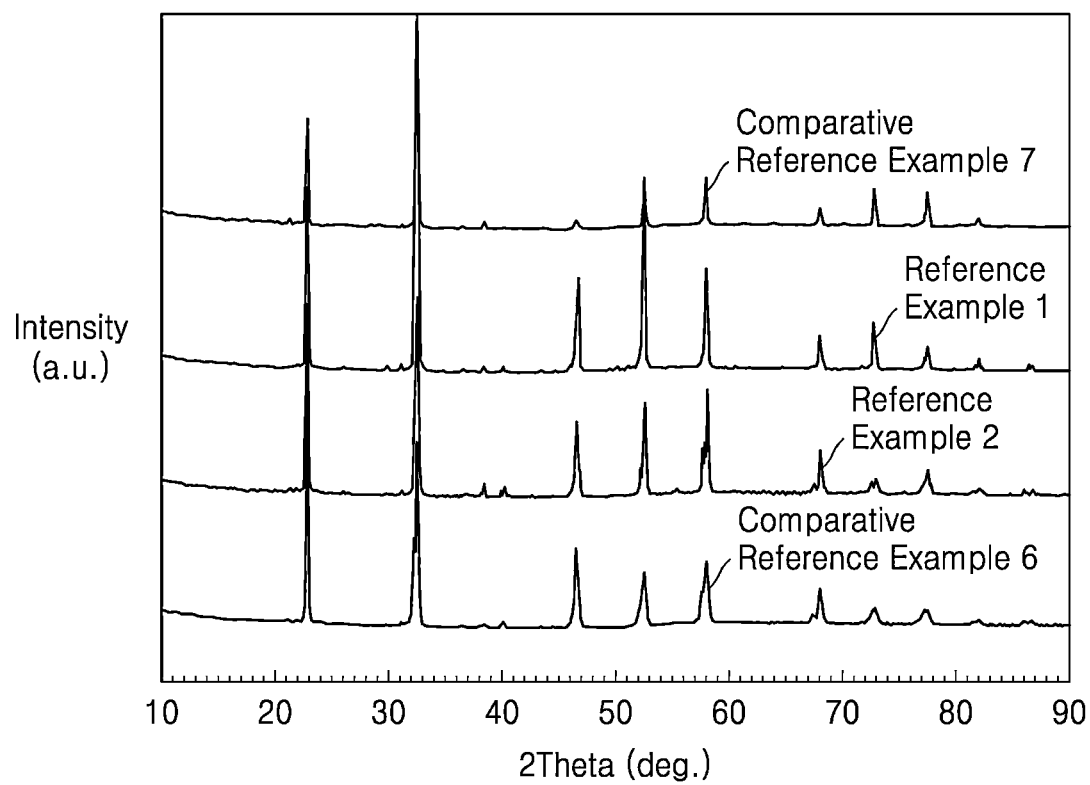
FIG. 1 shows the results of X-ray diffraction (XRD) spectra, obtained with Cu K$\alpha$ radiation, of $NaNbO_3$ binary dielectric materials of Reference Example 1, Reference Example 2, Comparative Reference Example 6, and Comparative Reference Example 7.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Equations such as "at least one of," when preceding a list of elements, modify the entire list of elements and do not modify the individual elements of the list.

Hereinafter, embodiments of a dielectric material according to the present disclosure, a device including the same, and a method of preparing the dielectric material will be described in greater detail with reference to the appended drawings. Accordingly, it should be apparent to those skilled in the art that the following description of various embodiments of the present disclosure is provided for illustration purpose only and not for the purpose of limiting the present disclosure as defined by the appended claims and their equivalents.

In the drawings, the size or thickness of each element may be exaggerated for clarity of description. When the terms "about" or "substantially" are used in this specification in connection with a numerical value, it is intended that the associated numerical value includes a manufacturing tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values.

Hereinafter, it will also be understood that when an element is referred to as being "on" or "above" another element, it can be "directly on and in contact" with the other element, or "in non-contact" with intervening elements thereon. As used herein, the singular forms "a", "an" and "the" are intended to include the plural forms as well, unless the context clearly indicates otherwise. When a portion is referred to as "comprising" or "including" an element, it means that, unless stated specifically otherwise, another element can further be included; rather than excluded. As used herein, the term "combination" includes a mixture, an alloy, a reaction product, and the like unless otherwise stated.

Although the terms "first," "second," "third," "fourth," "fifth," "sixth," etc., may be used herein to describe various elements and/or components, these elements and/or components should not be limited by these terms. These terms are used only to distinguish one component from another, not for purposes of limitation. The term "or" refers to "and/or" unless otherwise stated. As used herein, the term "connected" may refer to being connected directly or indirectly, or via a communication network.

As used herein, the terms "an embodiment", "embodiments", and the like indicate that elements described with regard to an embodiment are included in at least one embodiment described in this specification and may or may not present in other embodiments. In addition, it may be understood that the described elements are combined in any suitable manner in various embodiments. Unless otherwise defined, technical and scientific terms used herein have the same meaning as commonly understood by one or ordinary skill in the art to which this application belongs. All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

A dielectric material according to one or more embodiments may include a $NaNbO_3$ ternary material having a permittivity of 600 or more at 1 kHz, a temperature coefficient of capacitance (TCC), expressed by Equation 1, of about −15% to about 15% in a range of about −55° C. to about +200° C., wherein the $NaNbO_3$ ternary material includes a perovskite phase with a Sm element substituted into a Na site:

$$TCC\ (\%) = [(C - C_{RT})/C_{RT}] \times 100 \qquad [\text{Equation 1}]$$

wherein, in Equation 1, C is a capacitance value measured within a temperature range of −55° C. to 200° C., and $C_{RT}$ is a capacitance value measured at 25° C.

$BaTiO_3$, which is known as a ceramic capacitor material, has a Curie temperature (Tc) as low as 120° C. However, the maximum operating temperature required for a commercial X9R multi-layered ceramic capacitor (MLCC) is 200° C. Considering that an ultrathin-film MLCC is a core of the high-temperature electronic circuit assembly, an electronic material which is stable in a wide temperature range is beneficial.

$NaNbO_3$ has a Curie temperature (Tc) as high as about 350° C. $NaNbO_3$ has a low permittivity of 200 at room temperature. To increase permittivity at room temperature, a $NaNbO_3$ binary material including a $ABO_3$ perovskite phase in which a different element is substituted into the sodium (Na) site of $NaNbO_3$ is used in general. For example, a $NaNbO_3$ binary material having a perovskite phase in which a rare earth element is substituted into the Na site of $NaNbO_3$ may be used. However, in general, with an increase in permittivity of the $NaNbO_3$ binary material, temperature stability in the range of −55° C. to +200° C. also changes.

For example, the dielectric material according to one or more embodiments may include a $NaNbO_3$ ternary material including a perovskite phase in which a samarium (Sm) element is substituted into a Na site. The $NaNbO_3$ ternary material may have a permittivity of 600 or more at 1 kHz, a temperature coefficient of capacitance (TCC), expressed by Equation 1, of −15% to 15% in the range of −55° C. to +200° C.

A specific resistivity of the $NaNbO_3$ ternary material may be greater than $1 \times 10^{12}$ Ωcm and/or a dielectric loss factor (tan δ) of the $NaNbO_3$ ternary material may be 2.0 or less.

The dielectric material according to one or more embodiments may be a ceramic ferroelectric material that exhibits high permittivity even in a high electric field to which a high DC voltage is applied. Such a ferroelectric material includes a portion having a low AC sweeping energy barrier. Due to this, the ferroelectric material may exhibit high permittivity in response to AC sweeping even under a high electric field. For example, dielectric characteristics can be maintained even under a high electric field. In addition, stability may be maintained at a temperature, including high temperatures, in the range of −55° C. to +200° C.

The NaNbO$_3$ ternary material according to one or more embodiments may include a compound represented by Formula 1:

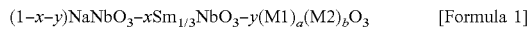

$(1-x-y)\text{NaNbO}_3-x\text{Sm}_{1/3}\text{NbO}_3-y(\text{M1})_a(\text{M2})_b\text{O}_3$     [Formula 1]

wherein, in Formula 1, M1 may be at least one of a Group 1 element, a Group 2 element, or a Group 15 element of the Periodic Table of the Elements, or a combination thereof; M2 may be at least one of a Group 4 transition metal element or a Group 5 transition metal element of the Periodic Table of the Elements, or a combination thereof; and $0.1 < x \le 0.15$, $0.001 \le y \le 0.1$, $0 < a < 1$, $0 < b < 1$, and $a+b=1$.

The NaNbO$_3$ and Sm$_{1/3}$NbO$_3$ in in the compound may form a solid solution. The solid solution may include a plurality of domains, and a polar nano region in the plurality of domains. The dielectric material includes a polar region (e.g., a polar nano region, polar layer, and/or a polar portion) in the plurality of domains, and thus forms a relaxor-ferroelectric material.

Figure 7:
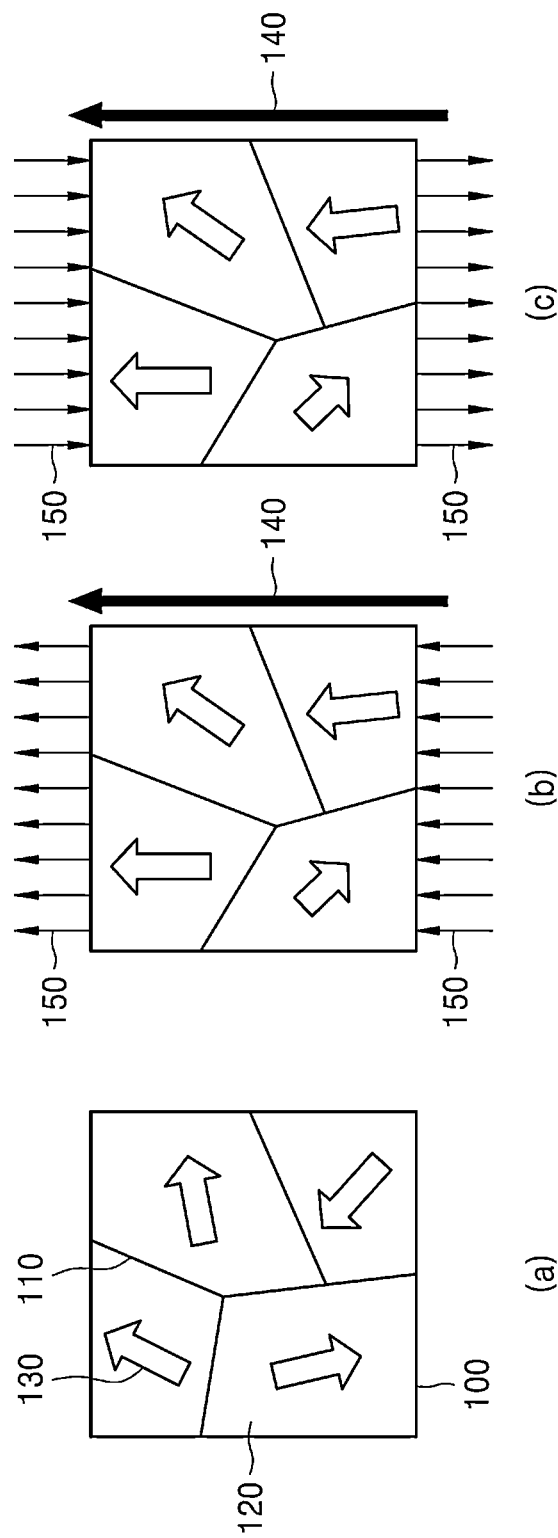
FIG. 7 is a conceptual diagram for explaining a case where spontaneous polarization in a thin film ferroelectric of the related art is fixed and thus permittivity is reduced.
Figure 8:
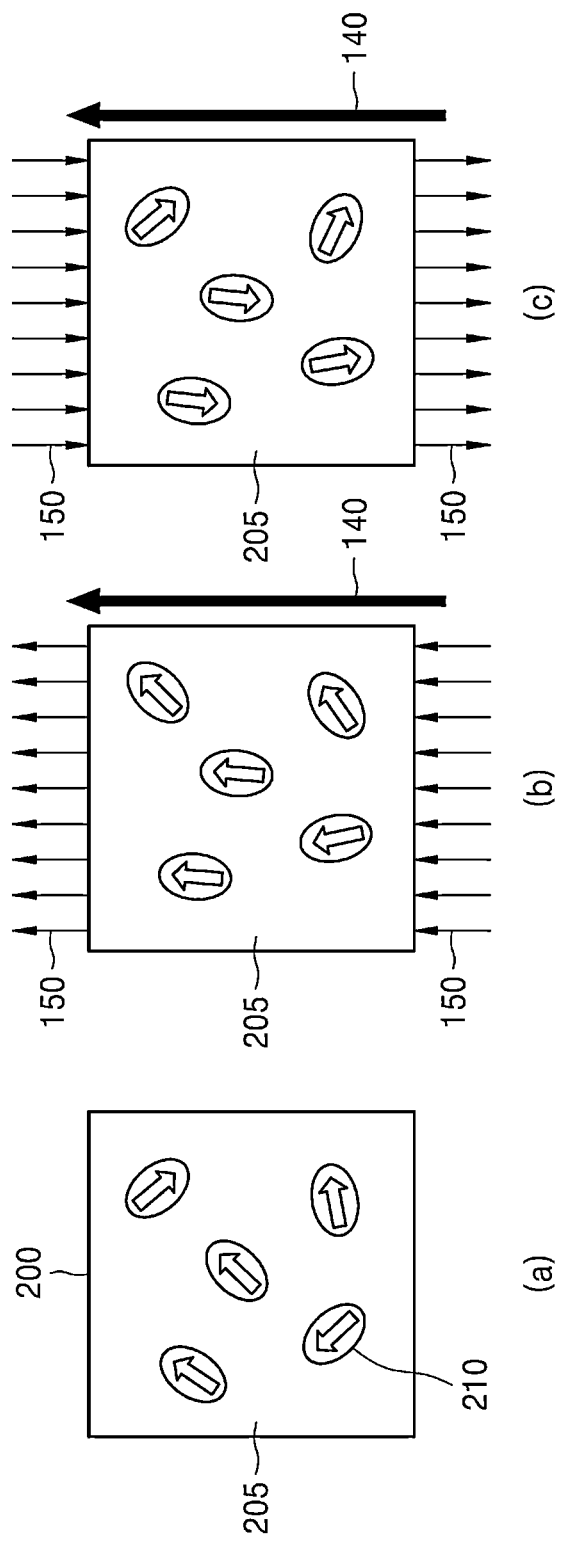
FIG. 8 is a conceptual diagram to describe a case in which, when a dielectric material according to some example embodiments is a relaxer-ferroelectric, high permittivity may be retained even under a high electric field due to a polar nano region (PNR) included in the relaxer-ferroelectric.

FIG. 7 is a conceptual diagram for explaining a case where spontaneous polarization in a thin film ferroelectric of the related art is fixed and thus permittivity is reduced; and FIG. 8 is a conceptual diagram to describe a case in which, when a dielectric material according to some example embodiments is a relaxer-ferroelectric, high permittivity may be retained even under a high electric field due to a polar nano region (PNR) included in the relaxer-ferroelectric.

In FIG. 7, a ferroelectric 100 may be a NaNbO$_3$ binary dielectric of which the thickness is thinned to be hundreds of nanometers according to a high-integration and miniaturization trend. Each domain 120 of the ferroelectric 100 has a polarization 130. The ferroelectric 100 may include boundaries 110 between domains 120. When an electric field is not applied to the ferroelectric 100, the polarizations 130 of each domain 120 is directed to an arbitrary direction as shown in (a). As a high DC voltage (e.g., a DC bias 140) is applied to the ferroelectric 100, the ferroelectric is put under a high electric field. Accordingly, the polarization 130 of each domain 120 of the ferroelectric 100 is generally aligned in the same direction as the DC bias 140, and the ferroelectric 100 as a whole exhibits a polarization in the same direction as the DC bias 140. Thereafter, as shown in (c), even when the direction of the alternating current (AC) bias 150 is changed to the opposite direction of the DC bias while the DC bias 140 is still being applied to the ferroelectric 100, the direction of the polarization 130 of each domain 120 is not changed and maintains the same direction as the DC bias 140. Therefore, as described above, after the polarization 130 of the ferroelectric 100 is fixed in the direction of the DC bias 140, the polarization 130 does not react to the change of the AC bias 150, and permittivity of the ferroelectric 100 is rapidly decreased. As a result, the ferroelectric 100 cannot effectively function as a dielectric material according the high-integration and miniaturization trend.

However, the ferroelectric according to some example embodiments may be a ceramic ferroelectric that exhibits higher permittivity than NaNbO$_3$ binary dielectric, even under a high electric field wherein a high DC voltage is applied. The ceramic ferroelectric includes a portion with a low energy barrier to an AC sweep, and the ferroelectric reacts to an AC sweep even under a high electric field due to the portion with a low energy barrier to an AC sweep and exhibits higher permittivity than NaNbO$_3$ binary dielectric. For example, the dielectric properties can be maintained even under a high electric field.

The dielectric material including the compound according to some example embodiments may be referred to as a relaxer-ferroelectric.

Referring to FIG. 8 the relaxer-ferroelectric may retain high permittivity even under a high electric field (for example, under a high DC bias) because it reacts well to AC bias due to a polar nano region (PNR) included in the relaxer-ferroelectric.

Figure 2:
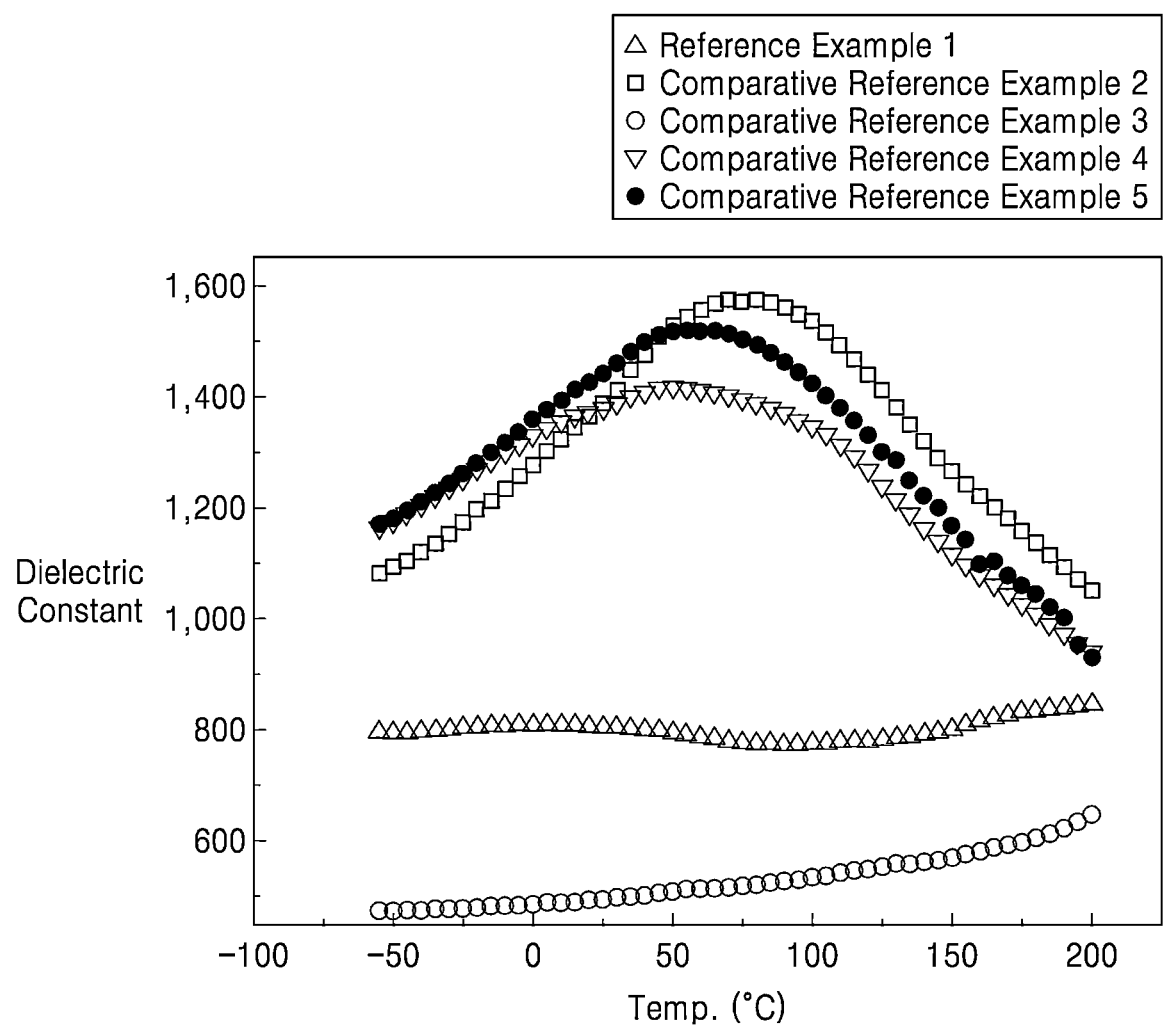
FIG. 2 shows the results of changes in dielectric constant with respect to temperature of the $NaNbO_3$ binary dielectric materials of Reference Example 1 and Comparative Reference Examples 2 to 5.

In FIG. 2, the relaxer-ferroelectric includes a ferroelectric 205 showing the first polarization characteristic, and the polar region 210 showing the second polarization characteristics in the ferroelectric 205.

The ferroelectric 205 is a dielectric material and/or a dielectric layer including the compound represented by Formula 1. The polar region 210 may be a region where a main element is substituted with another element in a part of the ferroelectric 205. For example, when the ferroelectric 205 is NaNbO$_3$ ternary material, the polar region 210 may be formed by a defect cluster where a sodium (Na) cation in an A site of NaNbO$_3$ is substituted with samarium (Sm) ion. The polar region 210 may be a polar nano region (PNR). The first polarization characteristic and the second polarization characteristic may be different from each other. The first polarization characteristic and the second polarization characteristic may include a spontaneous polarization characteristic. The relaxer-ferroelectric 200 may be expressed as a relaxer-ferroelectric layer. The polar region 210 may be expressed as a polar layer or polar portion.

In the relaxer-ferroelectric 200 of FIG. 8, the ferroelectric 205 includes a plurality of domains, like the ferroelectric 100 of FIG. 7, but, for convenience and clarity of illustration, the domains are not shown in FIG. 8. Each domain included in the ferroelectric 205 may include a plurality of polar regions 210. The polarization characteristics of the region except for the polar region 210 in each domain may differ from that of the polar region 210.

For example, the dielectric material including the compound, according to some example embodiments, becomes a relaxer-ferroelectric by forming PNRs. Since the polarization miniaturized to a nano size has a low energy barrier to an AC sweep even under a high electric field and DC bias, the fixation of the polarization is relieved. As a result, the dielectric material shows a relatively high effective permittivity for an AC bias change.

Without being limited to a particular theory or result, the dielectric material that formed the PNR and became a relaxer-ferroelectric increases the structural diversity due to the difference in ion radius of the substituent Sm as described above, and the Curie temperature (Tc) can be finely modified to allow permittivity to be insensitive to temperature change. As a result, permittivity of the dielectric material according to temperature becomes stable.

Hereinafter, the working principle of the dielectric material according to one or more embodiments will be described in brief.

The relaxor-ferroelectric material, which is a dielectric material according to an embodiment, may include: a ferroelectric material, which exhibits a first polarization characteristic; and a polar region, which is included in the ferroelectric material and exhibits a second polarization characteristic. The first polarization characteristic and the second polarization characteristic may be different from each other. The first polarization characteristic and the second polarization characteristic may include spontaneous polarization characteristics. Herein, the relaxor-ferroelectric material may be expressed as a relaxor-ferroelectric layer. The polar region may be expressed as a polar layer or a polar portion. The polar region is a region including a solid solution that includes a different material from the ferroelectric material. The ferroelectric material may be expressed as a ferroelectric layer. The ferroelectric material may have a thickness of about 1000 nm or less. When the ferroelectric material is a NaNbO$_3$ ternary material, the relaxor-ferroelectric material including the polar region may have an orthorhombic crystal structure.

For example, the polar region may be expressed as a region in which main elements of the ferroelectric material are substituted with other elements. When the ferroelectric material is NaNbO$_3$(NN), the polar region, which is a region formed by a defect cluster in which Na at A-site of NN is substituted with a first element and/or a second element that is different from Na, may be a polar nano region (PNR). The first element may be an element that serves as a donor, and the second element may be an element that serves as an acceptor. The first element and the second element may have different atomic radii.

The first element may be, for example, a Sm element. The second element may be, for example, a Group 1 element, a Group 2 element, a Group 15 metal element of the Periodic Table of the Elements, or a combination thereof. For example, the second element may be Na, Ba, Sr, Ca, Na, Bi, or a combination thereof.

The first polarization characteristic of the ferroelectric material may be different from the second polarization characteristic of the polar region due to the difference in the material of the polar region and the ferroelectric material, as described above. Accordingly, an energy barrier of the ferroelectric material and an energy barrier of the polar region, which respond to AC sweeping, may be different from each other. In one or more embodiments, the energy barrier of the polar region, which responds to AC sweeping, may be lower than the energy barrier of the ferroelectric material. For this reason, in the case where the relaxor-ferroelectric material is under a high DC bias, the total polarization of the ferroelectric material is fixed in the DC bias direction due to a high electric field by the DC bias, and there is no response to an AC bias applied to the relaxor-ferroelectric material, while the polar region may directly respond to an AC bias, and thus the polarization direction of the polar region may change in response to an AC bias. As a result, the relaxor-ferroelectric material may exhibit a high permittivity even under a high electric field caused by a high DC voltage.

The dielectric material according to one or more embodiments may include a NaNbO$_3$ ternary material including a perovskite phase in which a Sm element is substituted into a Na site of NaNbO$_3$. The NaNbO$_3$ ternary material may shift the Curie temperature (Tc) at which permittivity sharply increases, to room temperature, thus improving the overall permittivity. At the same time, while the NaNbO$_3$ ternary material becomes a relaxor, a change in permittivity (and/or capacity) in a range of −55° C. to +200° C. may be significantly reduced, and temperature stability may be improved.

The NaNbO$_3$ ternary material according to one or more embodiments may include a compound represented by Formula 2.

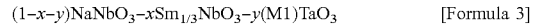

$(1-x-y)\text{NaNbO}_3-x\text{Sm}_{1/3}\text{NbO}_3-y(\text{M1})_c(\text{M1}')_d\text{TiO}_3$     [Formula 2]

wherein, in Formula 2,

M1 and M1' may each independently be at least one of a Group 1 element, a Group 2 element, or a Group 15 element of the Periodic Table of the Elements, and/or a combination thereof; and 0.1≤x≤0.15, 0.001≤y≤0.03, 0<c<1, 0<d<1, and c+d=1.

For example, in Formula 2, M1 and M1' may each independently be Ba, Sr, Ca, Na, Bi, or a combination thereof.

For example, in Formula 2, y may be 0.001 to 0.02.

The NaNbO$_3$ ternary material according to one or more embodiments may include a compound represented by Formula 3.

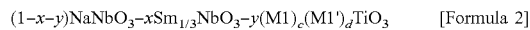

$(1-x-y)\text{NaNbO}_3-x\text{Sm}_{1/3}\text{NbO}_3-y(\text{M1})\text{TaO}_3$     [Formula 3]

wherein, in Formula 3, M1 may be a Group 1 element of the Periodic Table of the Elements; and 0.1<x≤0.15, and 0.001≤y≤0.1.

For example, in Formula 3, M1 may be Na.

For example, in Formula 3, y may be 0.01 to 0.1.

The NaNbO$_3$ ternary material according to one or more embodiments may include $(1-x-y)\text{NaNbO}_3-x\text{Sm}_{1/3}\text{NbO}_3-y\text{BaTiO}_3$, $(1-x-y)\text{NaNbO}_3-x\text{Sm}_{1/3}\text{NbO}_3-y\text{SrTiO}_3$, $(1-x-y)\text{NaNbO}_3-x\text{Sm}_{1/3}\text{NbO}_3-y\text{CaTiO}_3$, $(1-x-y)\text{NaNbO}_3-x\text{Sm}_{1/3}\text{NbO}_3-y\text{BicNadTiO}_3$, and/or $(1-x-y)\text{NaNbO}_3-x\text{Sm}_{1/3}\text{NbO}_3-y'\text{NaTaO}_3$, wherein x may be from 0.1 to 0.15, y may be from 0.001 to 0.03, y' may be from 0.001 to 0.1, c and d may each independently be larger than 0 to less than 1, and the sum of c and d may be 1.

The NaNbO$_3$ ternary material according to one or more embodiments may include $(0.85-y)\text{NaNbO}_3-0.15\text{Sm}_{1/3}\text{NbO}_3-y\text{BaTiO}_3$, $(0.85-y)\text{NaNbO}_3-0.15\text{Sm}_{1/3}\text{NbO}_3-y\text{SrTiO}_3$, $(0.85-y)\text{NaNbO}_3-0.15\text{Sm}_{1/3}\text{NbO}_3-y\text{CaTiO}_3$, $(0.85-y)\text{NaNbO}_3-0.15\text{Sm}_{1/3}\text{NbO}_3-y\text{BicNadTiO}_3$, and/or $(0.85-y)\text{NaNbO}_3-0.15\text{Sm}_{1/3}\text{NbO}_3-y'\text{NaTaO}_3$, wherein y may be from 0.001 to 0.03, y' may be from 0.001 to 0.1, c and d may each independently be larger than 0 or less than 1, and the sum of c and d may be 1.

A device according to one or more embodiments may include: a first electrode; a second electrode facing the first electrode; and a dielectric layer arranged between the first electrode and the second electrode, wherein the dielectric layer includes the dielectric material described above.

The device may be used in an electric circuit, an electronic circuit, an electromagnetic circuit, and/or the like, and is not particularly limited as long as the device provides an electrical output for an electrical input. The device may be (and/or include) a passive and/or an active element. The electrical input may be current or voltage, and the current may be direct current or alternating current. The electrical input may be a continuous input or an intermittent input with a constant cycle. The device may store electrical energy, electrical signals, magnetic energy, and/or magnetic signals. The device may be a semiconductor, a memory, a processor, and/or the like. The device may be, for example, a resistor, an inductor, a capacitor, and/or the like.

The device may be, for example, a capacitor.

For example, the device may be a multi-layered ceramic capacitor. The device may include: a plurality of first electrodes; a plurality of second electrodes, the plurality of first electrodes and the plurality of second electrodes being alternately arranged; and a plurality of dielectric layers arranged respectively between the plurality of first electrodes and the plurality of second electrodes.

Figure 5:
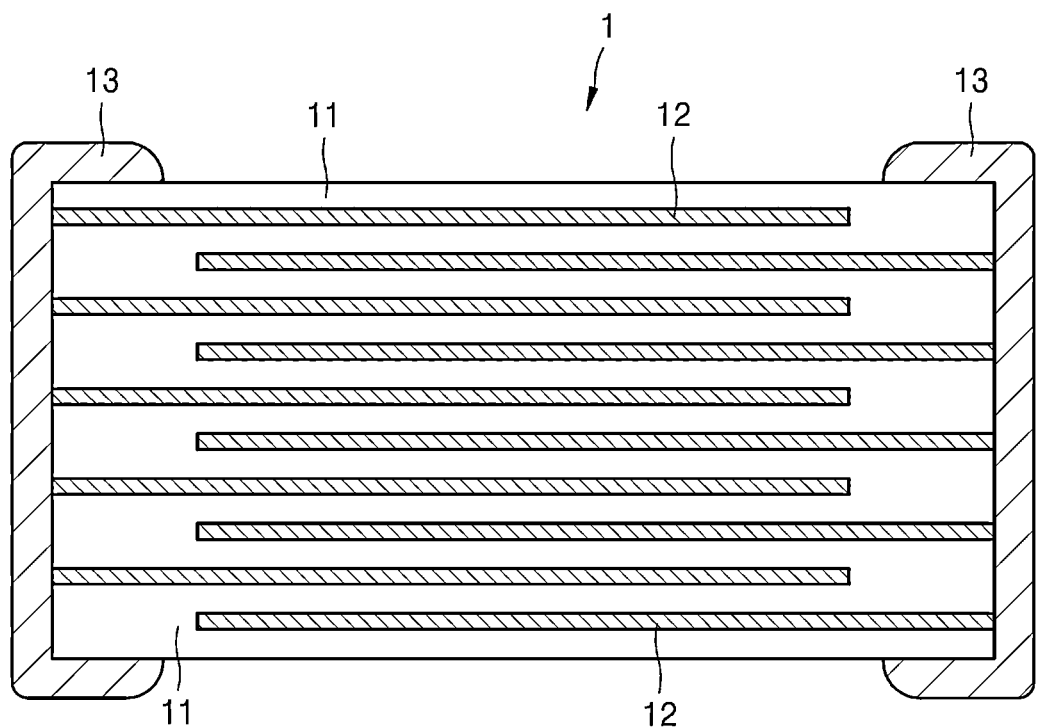
FIG. 5 is a schematic view of a multi-layered ceramic capacitor (MLCC) according to at least one example embodiment.
Figure 6:
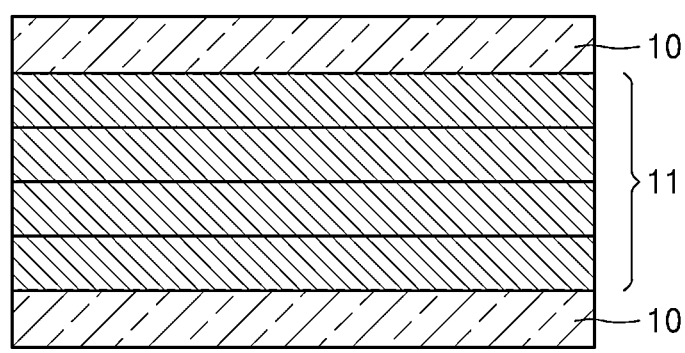
FIG. 6 is a schematic view showing protective layers respectively arranged on the upper portion and the lower portion of the dielectric layer of FIG. 5.

FIG. 5 is a schematic view of a multi-layered ceramic capacitor (MLCC) according to at least one example embodiment. FIG. 6 is a schematic view showing protective layers respectively arranged on the upper portion and the lower portion of the dielectric layer of FIG. 5.

Referring to FIG. 5, a multi-layered ceramic capacitor (MLCC) 1 may include: a plurality of internal electrodes 12; and a dielectric layer 11 alternately disposed between the plurality of internal electrodes 12. The internal electrode 12 may be a first electrode and/or a second electrode. For example, the first electrodes may correspond to a plurality of internal electrodes 12 connected to one of an external electrode 13, and the second electrodes may correspond to a plurality of internal electrodes 12 connected to another external electrode 13. The dielectric layer 11 may include the dielectric material according to one or more embodiments. The device may further include a protective layer on at least a portion of the upper portion and the lower portion of the dielectric layer.

Referring to FIG. 6, the dielectric layer 11 may include four dielectric layers, and the protective layers 10 may be arranged on the upper portion and the lower portion of the dielectric layers, respectively. The protective layer may be a single layer or a multilayer of at least two layers. The protective layer 10 may prevent an alkali metal, such as Na, from easily volatilizing when the dielectric material is heat-treated in an oxidizing atmosphere. The protective layer 10 may include, for example, $BaTiO_3$, $SrTiO_3$, $BaZrO_3$, $BaTiO_3$, $PbTiO_3$, $PbZrO_3$, $SrZrO_3$, $CaTiO_3$, $CaZrO_3$, $BaSnO_3$, $BaFeO_3$, and/or a combination thereof. However, the example embodiments are not limited thereto, and the protective layer 10 may include other metal oxides art, except for those of monovalent metal elements.

Referring to FIG. 5, the adjacent internal electrodes 12 may be electrically separated from one another by the dielectric layer 11 disposed therebetween. In the multi-layered ceramic capacitor 1, as the internal electrodes 12 and the dielectric layer 11 are alternately stacked, the dielectric layer 11 disposed between the adjacent internal electrodes 12 may act as a single unit capacitor. In the multi-layered ceramic capacitor 1, the number of internal electrodes 12 and the number of dielectric layers 11, which are alternately stacked, may each independently be, for example, 2 or larger, 5 or larger, 10 or larger, 20 or larger, 50 or larger, 100 or larger, 200 or larger, 500 or larger, 1,000 or larger, 2,000 or larger, 5,000 or larger, and/or 10,000 or larger. The multi-layered ceramic capacitor 1 may provide capacitance through the stacked structure in which a plurality of unit capacitors are stacked. As the number of stacked internal electrodes 12 and dielectric layers 11 increases, a contact area thereof may increase, thus increasing the capacitance. The area of the internal electrodes 12 may be smaller than the area of the dielectric layer 11. The plurality of the internal electrodes 12 may each have the same area. However, the adjacent internal electrodes 12 may be disposed not to be in the same position along the thickness direction of the multi-layered ceramic capacitor 1, and to partially protrude alternately in the directions of the opposing side surfaces of the multi-layered ceramic capacitor 1. The internal electrodes 12 may be formed, for example, using a conductive paste including at least one selected from nickel (Ni), copper (Cu), palladium (Pd), a palladium-silver (Pd—Ag) alloy, and/or the like. A printing method of the conductive paste may be a screen printing method and/or a gravure printing method, but is not necessarily limited thereto. The internal electrodes 12 may have a thickness of, for example, about 100 nm to about 5 μm, about 100 nm to about 2.5 μm, about 100 nm to about 1 μm, about 100 nm to about 800 nm, about 100 nm to about 400 nm, or about 100 nm to about 200 nm.

Referring to FIG. 5, a plurality of the internal electrodes 12, which are alternately stacked to partially protrude in directions of opposing side surfaces of the laminated ceramic capacitor 1, may be electrically connected to external electrodes 13. The external electrodes 13 may be disposed, for example, on a laminate including the plurality of internal electrodes 12 and the dielectric layer 11 alternately disposed between the plurality of the internal electrodes 12 and connected to the internal electrodes 12. The multi-layered ceramic capacitor 1 may include the internal electrodes 12, and external electrodes 13 respectively connected to the internal electrodes 12. The multi-layered ceramic capacitor 1 may include, for example, a pair of external electrodes 13 surrounding the opposite sides of a laminate structure including the internal electrodes 12 and the dielectric layer 11. The external electrodes 13 may be any material having electrical conductivity, such as metal, or may be a specific material, which may be determined considering electrical characteristics, structural stability, and the like. The external electrodes 13 may have, for example, a multilayer structure. The external electrodes 13 may, for example, include: an electrode layer, which contacts the laminate and the internal electrodes 12 and includes Ni; and a plating layer on the electrode layer.

For example, the dielectric layer 11 of the multi-layered ceramic capacitor 1 may be disposed to have an area that is larger than the area of the adjacent internal electrodes 12. The dielectric layer 11 disposed between the adjacent internal electrodes 12 in the multi-layered ceramic capacitor 1 may be, for example, connected to each other. The dielectric layer 11 disposed between the adjacent internal electrodes 12 may be connected to one another on the sides in contact with the external electrodes 13 in the multi-layered ceramic capacitor 1. For example, the external electrodes 13 may be omitted. In the case of the external electrodes 13 being omitted, the internal electrodes 12 protruding to the sides of the multi-layered ceramic capacitor 1 may be connected to a power source.

In a unit capacitor including the adjacent internal electrodes 12 and the dielectric layers 11 disposed therebetween, a thickness of the dielectric layer 11 and/or a gap between the adjacent internal electrodes 12 may be, for example, about 10 nm to about 1 μm, about 100 nm to about 800 nm, about 100 nm to about 600 nm, or about 100 nm to about 300 nm. In the unit capacitor including the adjacent internal electrodes 12 and the dielectric layers 11 disposed therebetween, the dielectric layer 11 may have a permittivity of 600 or larger at 1 kHz at room temperature (25° C.), and a temperature coefficient of capacitance (TCC), expressed by Equation 1, of about −15% to about 15% in a range of about −55° C. to about +200° C.

By the inclusion of the dielectric layer 11 having such a small thickness and high permittivity, the multilayer stack capacitor 1 may have increased capacitance and have reduced thickness and volume. Accordingly, a smaller, thinner capacitor with higher capacity may be provided.

Figure 9A:
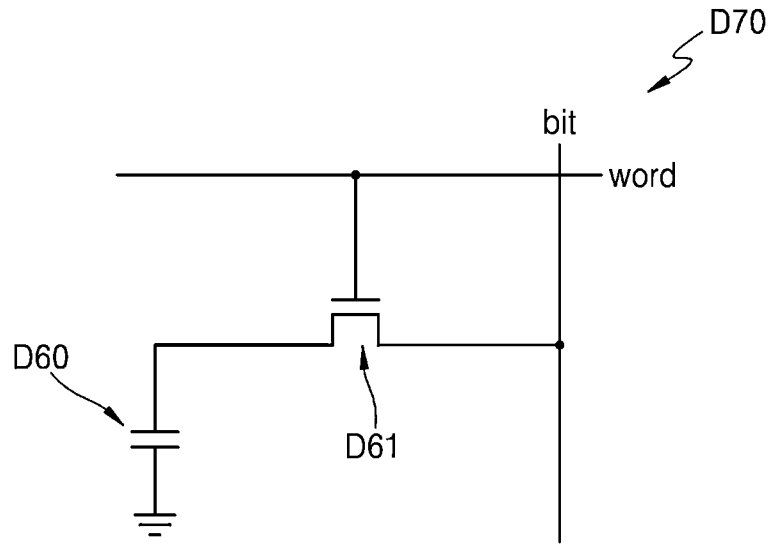
FIG. 9A illustrates a circuit configuration of a memory cell of a memory device including a semiconductor device and a capacitor.
Figure 9B:
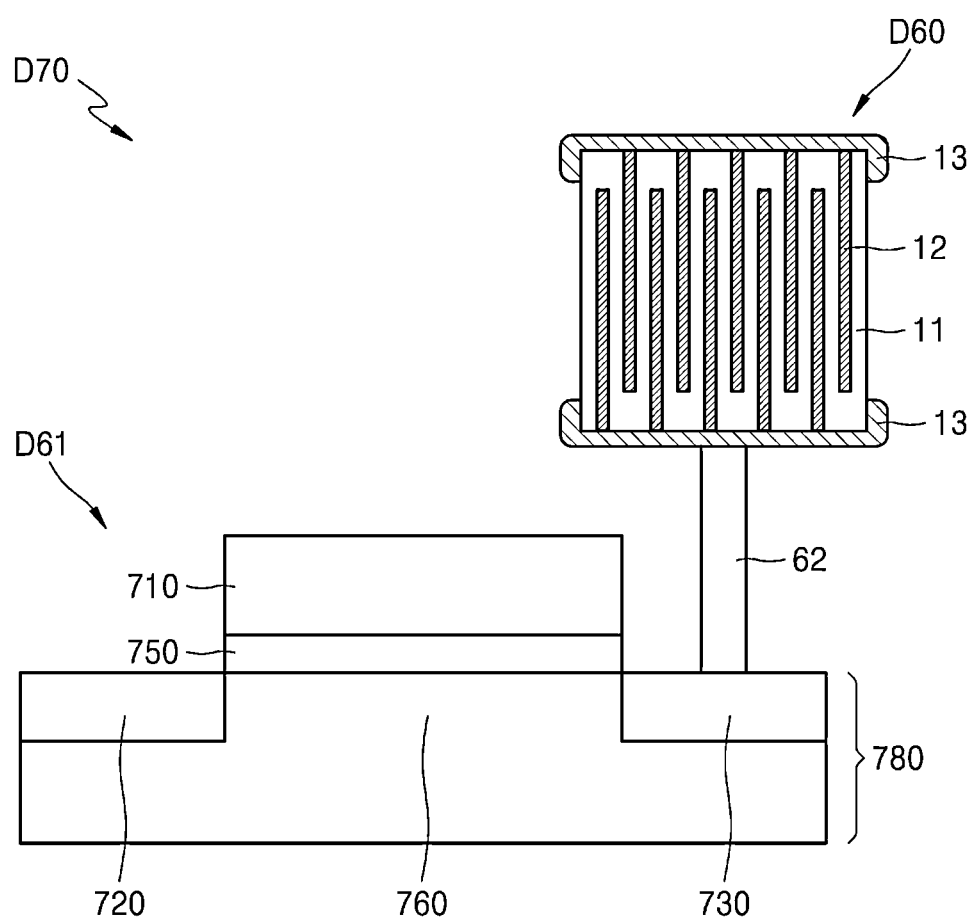
FIG. 9B is a schematic diagram showing a semiconductor apparatus according to some example embodiments.

FIG. 9A illustrates a circuit configuration of a memory cell of a memory device including a semiconductor device and a capacitor. FIG. 9B is a schematic diagram showing a semiconductor apparatus according to some example embodiments.

Referring to FIGS. 9A and 9B, the semiconductor apparatus D70 may be included in a memory device as a memory cell and may include a transistor D61 and a capacitor D60 electrically connected to, for example, a source region 730 of the transistor D61. The memory device may include a plurality of bit lines and a plurality of word lines and may further include a plurality of the memory cells. Each word line may be electrically connected to a gate electrode 710 of the transistor D61, and each bit line may be electrically connected to a drain region 720 of the transistor D61. An electrode of the capacitor D60 may be connected to, for example, a voltage controller (not shown).

The semiconductor apparatus D70 may be included in a plurality of semiconductor apparatuses, for example in a memory cell array.

The capacitor D60 may be, for example the multi-layer capacitor 1 of FIG. 5 and/or a capacitor including, in the dielectric, the compound represented by Formula 1. One of the outer electrodes 13 of the capacitor D60 and one of the source region 730 and the drain region 720 of the transistor D61 may be electrically connected by a contact 62. The contact 62 may include a conductive material, such as tungsten, copper, aluminum, polysilicon, and/or the like.

The field effect transistor D61 may include a substrate 780 including a source region 730, a drain region 720, and a channel 760, and a gate electrode 710 facing the channel 760. A dielectric layer 750 may be between the substrate 780 and the gate electrode 710.

The semiconductor apparatus D70, the capacitor D60, and/or the field effect transistor D61 may be included, in an electronic device architecture.

Figure 10:
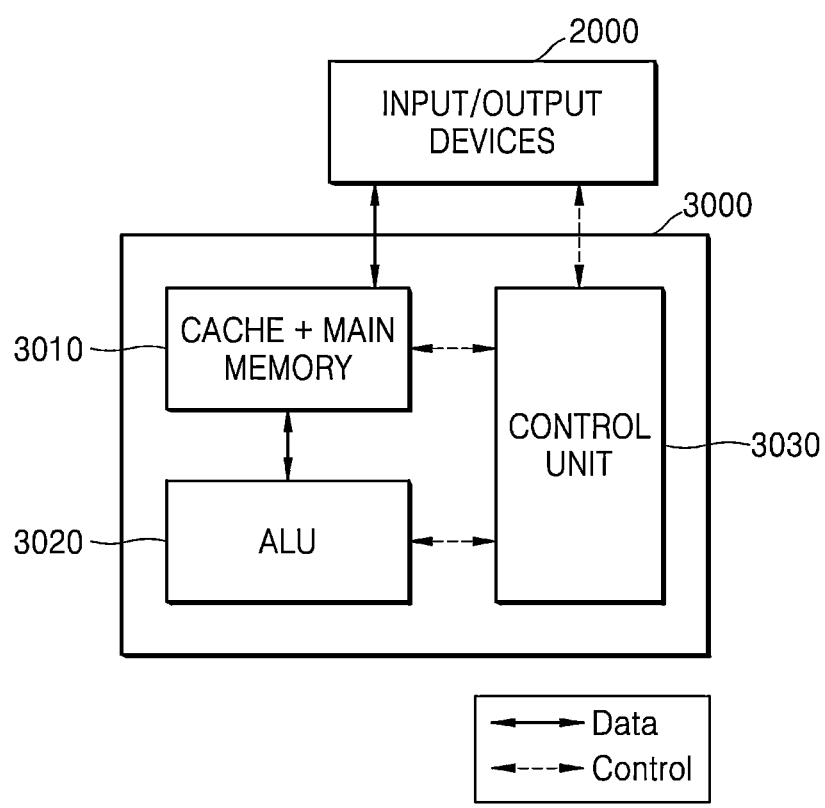
FIGS. 10 and 11 are conceptual views schematically illustrating electronic device architectures applicable to electronic devices according to some example embodiments.
Figure 11:
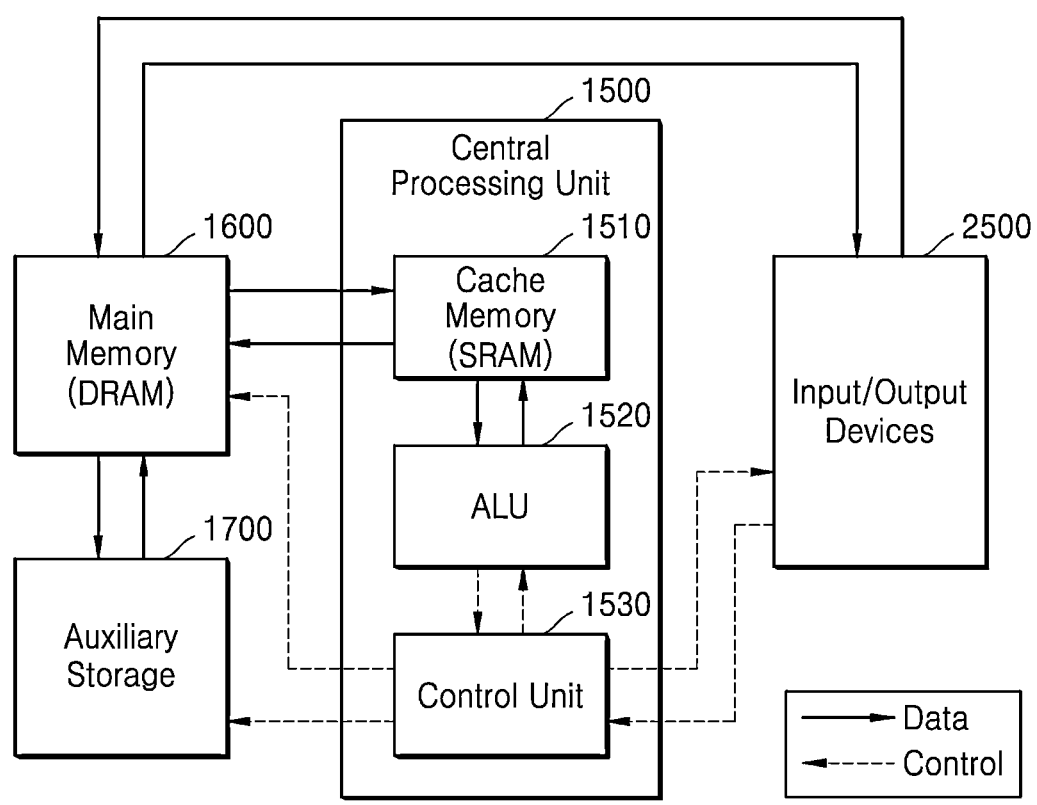

FIGS. 10 and 11 are conceptual views schematically illustrating electronic device architectures applicable to electronic devices according to some example embodiments.

Referring to FIG. 10, an electronic device architecture 3000 may include a memory unit 3010, an arithmetic logic unit (ALU) 3020, and a control unit 3030. The memory unit 3010, the ALU 3020, and the control unit 3030 may be electrically connected to each other. For example, the electronic device architecture 3000 may be implemented as a single chip including the memory unit 3010, the ALU 3020, and/or the control unit 3030. For example, the memory unit 3010, the ALU 3020, and the control unit 3030 may be connected to each other through metal lines on a chip for direct communication therebetween. The memory unit 3010, the ALU 3020, and/or the control unit 3030 may be monolithically integrated on a single substrate to form a single chip. Input/output devices 2000 may be connected to the electronic device architecture (chip) 3000. The control unit 3030 may include processing circuitry such as hardware including logic circuits; a hardware/software combination such as a processor executing software; and/or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. Similarly, though the electronic device architecture 3000 is illustrated as including the ALU 3020, the electronic device architecture 3000 is not limited, and may contain additional and/or alternative processing circuitry. The memory unit 3010 may include a main memory and a cache memory. The electronic device architecture (chip) 3000 may be an on-chip memory processing unit.

The memory unit 3010, the ALU 3020, and/or the control unit 3030 may each independently include the above-described compound.

Referring to FIG. 11, a cache memory 1510, an ALU 1520, and a control unit 1530 may form a central processing unit (CPU) 1500, and the cache memory 1510 may include a static random access memory (SRAM). A main memory 1600 and an auxiliary storage 1700 may be provided apart from the CPU 1500. The main memory 1600 may include a dynamic random access memory (DRAM) including layer structures such as those described above.

In some cases, an electronic device architecture may be implemented in a form in which unit computing devices and unit memory devices are adjacent to each other on a single chip without sub-units.

A method of preparing a dielectric material, according to one or more embodiment, may include: mechanically milling a mixture of a Nb compound, a Na salt, a Sm compound, a M1-containing salt, and a M2-containing salt; and performing first heat treatment in an oxidizing atmosphere, thereby preparing the dielectric material including a compound represented by Formula 1:

$$(1-x-y)\text{NaNbO}_3-x\text{Sm}_{1/3}\text{NbO}_3-y(\text{M1})_a(\text{M2})_b\text{O}_3 \quad \text{[Formula 1]}$$

wherein, in Formula 1, M1 may be a Group 1 element, a Group 2 element, or a Group 15 element, or a combination thereof; M2 may be a Group 4 transition metal element or a Group 5 transition metal element, or a combination thereof; and $0.1<x\leq 0.15$, $0.001\leq y\leq 0.1$, $0<a<1$, $0<b<1$, and $a+b=1$.

Figure 4:
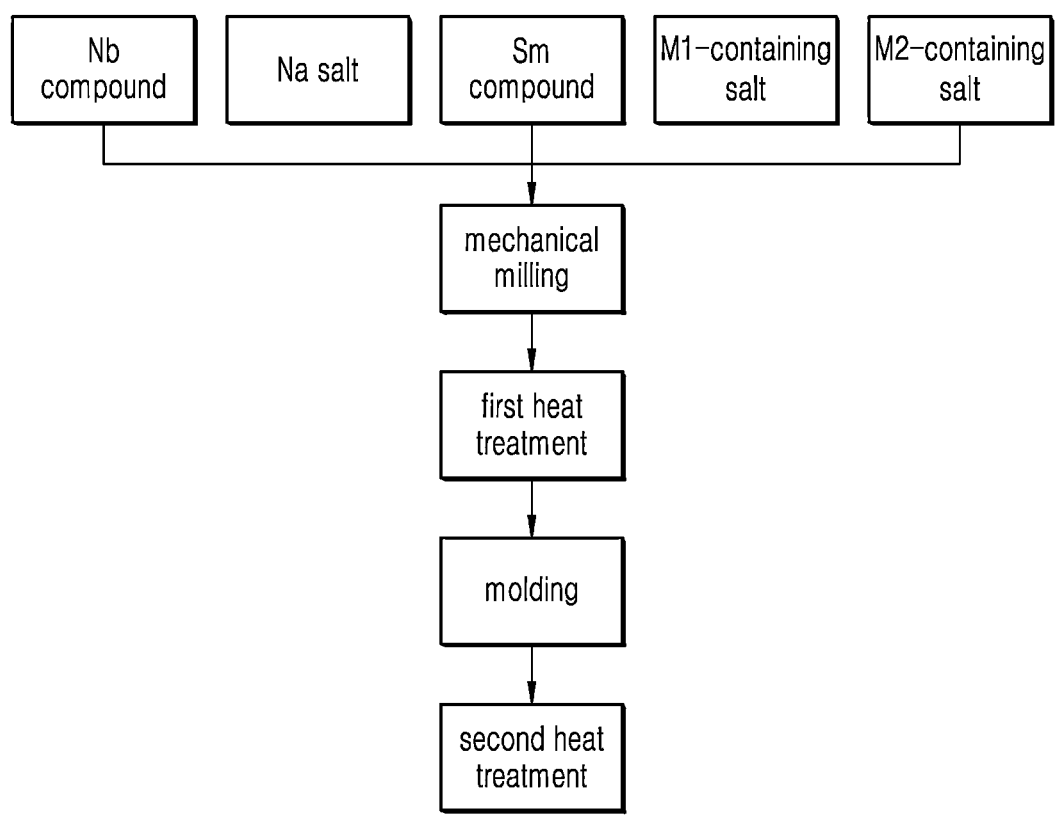
FIG. 4 is a flowchart schematically showing a method of preparing a dielectric material according to at least one example embodiment.

FIG. 4 is a flowchart schematically showing a method of preparing a dielectric material according to at least one embodiment.

Referring to FIG. 4, a mixture of a Nb compound, a Na salt, a Sm compound, a M1-containing salt, and a M2-containing salt is prepared. For example, in some example embodiments, the Nb compound may be niobium oxide; the Na salt may be sodium carbonate, sodium sulfate, or a combination thereof; the Sm compound may be a samarium oxide; and/or the M1-containing salt and M2-containing salt may each independently be barium carbonate, barium sulfate, strontium sulfate, calcium carbonate, calcium sulfate, sodium carbonate, sodium sulfate, bismuth carbonate, bismuth sulfate, or a combination thereof. Though not illustrated, in some example embodiments, the mixture may further include a Ti compound. For example, the Ti compound may be titanium oxide.

The amounts of the Nb compound, the Na salt, the Sm compound, the M1-containing salt, the M2-containing salt, and/or the Ti compound may be stoichiometrically controlled so as to obtain the compound represented by Formula 1.

Next, the mixture is mechanically milled. The mechanical milling may be ball milling, air-jet milling, bead milling, roll milling, hand milling, high-energy ball milling, planetary milling, stirred ball milling, vibrating milling, mechanofusion milling, shaker milling, attritor milling, disk milling, shape milling, nauta milling, nobilta milling, high-speed mixing, a combination thereof, and/or the like. In some example embodiments, the mechanical milling may be and/or include, for example, wet milling using a solvent. When the mechanical milling is performed by wet milling, a dielectric material with improved permittivity characteristics may be prepared.

In the wet milling using a solvent, a volatile solvent (e.g., with a low enthalpy of vaporization) such as ethanol and/or the like may be used as the solvent. Although the mechanical milling time varies according to milling conditions, the mechanical milling time may be, for example, about 1 hour to about 30 hours, for example, about 5 hours to about 25 hours.

The mechanically milled mixture is subjected to a first heat treatment in an oxidizing atmosphere. The first heat treatment may be performed at about 800° C. to about 1000° C. For example, the first heat treatment may be performed at about 850° C. to about 950° C. The first heat treatment may be performed for about 1 hour to about 30 hours, or for about 2 hours to about 15 hours. By the heat treatment under an oxidizing atmosphere in such time periods, the dielectric material may have further improved dielectric characteristics.

The method may further include, after the first heat treatment in the oxidizing atmosphere, obtaining a molded body using a product obtained from the first heat treatment; and performing second heat treatment on the molded product. The obtaining the molded body may, for example, include molding the product obtained from the first heat treatment, for example, by applying a uniaxial pressure to the product to produce a pellet. In some example embodiments, the molding may include, for example, a mold, but is not limited thereto.

The second heat treatment may be performed at about 1000° C. to about 1600° C. For example, the second heat treatment may be performed at about 1200° C. to about 1400° C. The second heat treatment may be performed for about 1 hour to about 30 hours, or for about 3 hours to about 25 hours. By the further inclusion of the second heat treatment under such conditions, defects of the dielectric material may be effectively prevented. For example, the second heat treatment may be used to anneal and/or sinter the dielectric material.

The first heat treatment (and/or second heat treatment) in an oxidizing atmosphere may be carried out under an atmosphere including oxygen, carbon dioxide, and/or the like. In an atmosphere containing oxygen, carbon dioxide, and/or the like, the amount of oxygen, carbon dioxide, and/or the like may be, for example, about 0.1% to about 21% by volume, about 0.1% to about 10% by volume, about 0.1% to about 5% by volume, about 0.1% to about 3% by volume, and/or about 0.5% to about 2% by volume of the total gas volume. The remainder gas, excluding oxygen, carbon dioxide, and/or the like, may be an inert gas. The inert gas may be argon, nitrogen, and/or the like, but is not limited thereto, and may be any inert gas used in the art.

In some example embodiments, the term "oxidizing atmosphere" may refer to, for example, an ambient air atmosphere.

The dielectric material prepared by the preparation method described above may have high permittivity and high specific resistivity and may also be stable at high temperatures.

One or more embodiments of the present disclosure will now be described in detail with reference to the following examples and comparative examples. However, these examples are only for illustrative purposes and are not intended to limit the scope of the present disclosure.

EXAMPLES (Preparation of $NaNbO_3$ Binary Dielectric Material)

Reference Example 1

$Nb_2O_5$, $Na_2CO_3$, and $Sm_2O_3$ were mixed in a reactor to obtain a mixture, and ethanol and zirconia balls were added thereto, and then ball-milled at room temperature in an air atmosphere for 24 hours to prepare a mixture. The prepared mixture was dried at 100° C. for 1 day to obtain dried powder. The amounts of $Nb_2O_5$, $Na_2CO_3$, and $Sm_2O_3$ were stoichiometrically controlled so as to obtain the dielectric material as in Table 1.

The dried powder was put into an alumina crucible, and then subjected to a first heat treatment at 900° C. in an air atmosphere for 5 hours.

The first heat treatment product was pressed with uniaxial pressure to prepare pellets. The prepared pellets were secondarily heat-treated at 1300° C. in an atmosphere for 2 hours to prepare a dielectric material having a composition as represented in Table 1.

Reference Example 2

A dielectric material was prepared in the same manner as in Reference Example 1, except that stoichiometric amounts were controlled to be different from those of Example 1.

Comparative Reference Example 1

A dielectric material was prepared in the same manner as in Reference Example 1, except that the mixture was prepared using $Gd_2O_3$ instead of $Sm_2O_3$, and the stoichiometric amounts were controlled so as to obtain the dielectric material as in Table 1 through second heat treatment at 125° C. for 2 hours.

Comparative Reference Example 2

A dielectric material was prepared in the same manner as in Reference Example 1, except that $Y_2O_3$ was used instead of $Sm_2O_3$, and the stoichiometric amounts were controlled so as to obtain the dielectric material as in Table 1.

Comparative Reference Example 3

A dielectric material was prepared in the same manner as in Reference Example 1, except that $La_2O_3$ was used instead of $Sm_2O_3$, and the stoichiometric amounts were controlled to be so as to obtain the dielectric material as in Table 1.

Comparative Reference Example 4

A dielectric material was prepared in the same manner as in Reference Example 1, except that $Yb_2O_3$ was used instead of $Sm_2O_3$, and the stoichiometric amounts were controlled so as to obtain the dielectric material as in Table 1.

Comparative Reference Example 5

A dielectric material was prepared in the same manner as in Reference Example 1, except that $Dy_2O_3$ was used instead of $Sm_2O_3$, and the stoichiometric amounts were controlled so as to obtain the dielectric material as in Table 1.

Comparative Reference Examples 6 to 8

A dielectric material was prepared in the same manner as in Reference Example 1, except that the stoichiometric amounts of $Nb_2O_5$, $Na_2CO_3$, and $Sm_2O_3$ were controlled to be different from those of Example 1, so as to obtain the dielectric material as in Table 1.

TABLE 1

| Example | Composition of $NaNbO_3$ binary dielectric material |
|---|---|
| Reference Example 1 | $0.85NaNbO_3$-$0.15Sm_{1/3}NbO_3$ |
| Reference Example 2 | $0.90NaNbO_3$-$0.10Sm_{1/3}NbO_3$ |
| Comparative Reference Example 1 | $0.85NaNbO_3$-$0.15Gd_{1/3}NbO_3$ |

TABLE 1-continued

| Example | Composition of $NaNbO_3$ binary dielectric material |
|---|---|
| Comparative Reference Example 2 | $0.85NaNbO_3$-$0.15Y_{1/3}NbO_3$ |
| Comparative Reference Example 3 | $0.85NaNbO_3$-$0.15La_{1/3}NbO_3$ |
| Comparative Reference Example 4 | $0.85NaNbO_3$-$0.15Yb_{1/3}NbO_3$ |
| Comparative Reference Example 5 | $0.85NaNbO_3$-$0.15Dy_{1/3}NbO_3$ |
| Comparative Reference Example 6 | $0.95NaNbO_3$-$0.05Sm_{1/3}NbO_3$ |
| Comparative Reference Example 7 | $0.80NaNbO_3$-$0.20Sm_{1/3}NbO_3$ |
| Comparative Reference Example 8 | $0.75NaNbO_3$-$0.25Sm_{1/3}NbO_3$ |

(Preparation of $NaNbO_3$ Ternary Dielectric Material)

Example 1

$Nb_2O_5$, $Na_2CO_3$, $Sm_2O_3$, $BaCO_3$, and $TiO_2$ were mixed in a reactor to obtain a mixture, and ethanol and zirconia balls were added thereto, and then ball-milled at room temperature in an air atmosphere for 24 hours to prepare a mixture. The prepared mixture was dried at 100° C. for 1 day to obtain dried powder. The amounts of $Nb_2O_5$, $Na_2CO_3$, $Sm_2O_3$, $BaCO_3$, and $TiO_2$ were stoichiometrically controlled in order to prepare a dielectric material as represented in Table 2.

The dried powder was put into an alumina crucible, and then subjected to first heat treatment at 900° C. in an air atmosphere for 5 hours.

The first-heat treatment product was pressed with uniaxial pressure to prepare pellets. The prepared pellets were pressed at a cold isotactic pressure (CIP) of 200 MPa for 3 minutes to obtain a molded body.

The molded body was secondarily heat-treated at 1300° C. in an air atmosphere for 2 hours to prepare a dielectric material having a composition as represented in Table 2.

Example 2

A dielectric material was prepared in the same manner as in Example 1, except that $SrCO_3$ was used instead of $BaCO_3$, and the stoichiometric amounts were controlled so as to obtain the dielectric material as in Table 2.

Example 3

A dielectric material was prepared in the same manner as in Example 1, except that $CaCO_3$ was used instead of $BaCO_3$, and the stoichiometric amounts were controlled so as to obtain a dielectric material as in Table 2.

Examples 4 and 5

Dielectric materials were prepared in the same manner as in Example 1, except that $Na_2CO_3$ and $Ta_2O_5$ were used instead of $BaCO_3$ and $TiO_2$, respectively, to prepare dielectric materials as in Table 2.

Comparative Example 1

A dielectric material was prepared in the same manner as in Example 1, except that the stoichiometric amounts of $Nb_2O_5$, $Na_2CO_3$, $Sm_2O_3$, $BaCO_3$, and $TiO_2$ were controlled to be different from those of Example 1, so as to obtain a dielectric material as in Table 2.

Comparative Example 2

A dielectric material was prepared in the same manner as in Example 1, except that $SrCO_3$ was used instead of $BaCO_3$, and the stoichiometric amounts were controlled to be different from those of Example 2, so as to obtain a dielectric material as in Table 2.

Comparative Example 3

A dielectric material was prepared in the same manner as in Example 1, except that $CaCO_3$ was used instead of $BaCO_3$, and the stoichiometric amounts were controlled to be different from those of Example 3, so as to obtain a dielectric material as in Table 2.

TABLE 2

| Example | Composition of $NaNbO_3$ ternary dielectric material |
|---|---|
| Example 1 | $0.83NaNbO_3$-$0.15Sm_{1/3}NbO_3$-$0.02BaTiO_3$ |
| Example 2 | $0.83NaNbO_3$-$0.15Sm_{1/3}NbO_3$-$0.02SrTiO_3$ |
| Example 3 | $0.83NaNbO_3$-$0.15Sm_{1/3}NbO_3$-$0.02CaTiO_3$ |
| Example 4 | $0.80NaNbO3$-$0.15Sm_{1/3}NbO_3$-$0.05NaTaO_3$ |
| Example 5 | $0.75NaNbO_3$-$0.15Sm_{1/3}NbO_3$-$0.1NaTaO_3$ |
| Comparative Example 1 | $0.81\ NaNbO_3$-$0.15Sm_{1/3}NbO_3$-$0.04BaTiO_3$ |
| Comparative Example 2 | $0.81\ NaNbO_3$-$0.15Sm_{1/3}NbO_3$-$0.04SrTiO_3$ |
| Comparative Example 3 | $0.81\ NaNbO_3$-$0.15Sm_{1/3}NbO_3$-$0.04CaTiO_3$ |

Evaluation Example 1: X-Ray Diffraction Test

X-ray diffraction spectra (XRD) of the $NaNbO_3$ binary dielectric materials of Reference Example 1, Reference Example 2, Comparative Reference Example 6, and Comparative Reference Example 7, which have different $Sm_{1/3}NbO_3$ molar ratios, were measured with Cu Kα radiation. Using a D8 Advance, XRD spectrum analysis was performed on the powder obtained by grinding the pellets of each dielectric material. The results are shown in FIG. 1.

Referring to FIG. 1, the $NaNbO_3$ binary dielectric materials of Reference Example 1, Reference Example 2, Comparative Reference Example 6, and Comparative Reference Example 7 were all found to have a single phase and an orthorhombic phase but did not form a secondary phase.

Evaluation Example 2: Dielectric characteristic, specific resistivity characteristic, and temperature characteristic of $NaNbO_3$ binary dielectric materials Dielectric characteristic, specific resistivity characteristic, and temperature characteristic of each $NaNbO_3$ binary dielectric material were evaluated according to the following methods. The results are shown in Tables 3 and 4 and FIG. 2. Table 1 shows the results of evaluation of the dielectric characteristic, specific resistivity characteristic, and temperature characteristic of each of the $NaNbO_3$ binary dielectric materials of Reference Example 1 and Comparative Reference Example 1 to Comparative Reference Example 5 in which different rare earth elements were substituted into Na site of $NaNbO_3$. Table 2 shows the results of evaluation of the dielectric characteristic, specific resistivity characteristic, and temperature characteristic of each of the $NaNbO_3$ binary dielectric materials of Reference Example 1, Reference Example 2, and Comparative Reference Example 6 to Comparative Reference Example 8 that were prepared in different $Sm_{1/3}NbO_3$ molar ratios. FIG. 2 shows the results of changes in dielectric constant with respect to temperature of the $NaNbO_3$ binary dielectric materials of Reference Example 1 and Comparative Reference Examples 2 to 5.

(1) Grain Size and Relative Density

The grain size of each dielectric material was measured using a scanning electron microscope (SEM, S-5500, Hitachi, Ltd.). The relative density of each dielectric material was measured using a buoyancy method (e.g., the Archimedes method) as a relative density with respect to the density of 100% when no pores exist.

(2) Nominal Permittivity (Er, Tan δ)

Silver (Ag) was coated on the opposite surfaces of the dielectric pellets to form electrodes, and then permittivity was measured at room temperature (25° C.) using an E4980A Precision LCR Meter (Keysight) at an AC voltage of 1 V and a frequency of 1 kHz.

In Table 3, Er denotes permittivity, and tan δ denotes loss factor.

(3) Temperature Characteristic

To determine the temperature characteristic (e.g., the temperature coefficient of capacitance (TCC)), capacitance was measured at temperatures from −55° C. to 200° C. at 5° C. intervals in a temperature-controlled chamber with reference to X9S of the EIA specification. The temperature characteristic is represented by Equation 1.

$$\text{TCC (\%)} = [(C - C_{RT}/C_{RT}] \times 100 \quad \text{[Equation 1]}$$

wherein, in Equation 1, C is a capacitance value measured within a temperature range of −55° C. to 200° C., and $C_{RT}$ is a capacitance value measured at 25° C.

(4) Vacuum Permittivity ($\varepsilon_0$), Effective Permittivity ($\varepsilon$), and Permittivity Change Rate ($\Delta\varepsilon/\varepsilon_0$)

Using Premier II Ferroelectric Tester (Radiant Technologies, Inc.) measurement was performed under the condition of applying a DC electric field of 0 kV/μm or 87 kV/μm and using an AC electric field of 87 mV/μm at a frequency of 1 kHz.

The permittivity change rate ($\Delta\varepsilon/\varepsilon_0$) is represented by Equation 2. In Tables 3 and 4, values obtained by multiplying the permittivity change rate by 100 are shown.

$$\Delta\varepsilon/\varepsilon_0 = (\varepsilon - \varepsilon_0)/\varepsilon_0 \quad \text{[Equation 2]}$$

wherein, in Equation 2, $\varepsilon$ is a permittivity at dc=8.7 kV/μm, i.e., an effective permittivity, and $\varepsilon_0$ is a permittivity at dc=0 kV/μm.

(5) Specific Resistivity (ρ)

Using Premier II Ferroelectric Tester (Radiant Technologies, Inc.) specific resistivity was measured for 1 second at a frequency of 1 kHz after stabilization for 60 seconds, under the condition of applying a DC high-electric field (87 kV/μm).

TABLE 3

| Example | Relative density (%) | Nominal permittivity (@ 1 kHz) $\varepsilon_r$ | tanδ | $\varepsilon_0$ (@ 1 kHz) | $\varepsilon$ (@ 1 kHz) | $\Delta\varepsilon/\varepsilon_0 \times 100$ (%) | Specific resistivity (ρ) (Ωcm) | Temperature characteristic TCC (%) |
|---|---|---|---|---|---|---|---|---|
| Reference Example 1 | >99 | 760 | 0.8 | 760 | 566 | 25.5 | $1.7 \times 10^{12}$ | −5~4 |
| Comparative Reference Example 1 | >99 | 1,409 | 1.2 | 1,349 | 876 | 35.1 | $1.3 \times 10^{12}$ | −22~0 |
| Comparative Reference Example 2 | >99 | 1,403 | 1.9 | 1,422 | 1,030 | 28 | $8.0 \times 10^{11}$ | −27~14 |
| Comparative Reference Example 3 | >99 | 411 | 0.5 | 495 | 469 | 5.3 | $5.7 \times 10^{11}$ | −4~31 |
| Comparative Reference Example 4 | >99 | 1,337 | 1.6 | 1,427 | 942 | 34.0 | $6.5 \times 10^{11}$ | −32~3 |
| Comparative Reference Example 5 | >99 | 1,425 | 1.8 | 1,562 | 962 | 38.4 | $4.4 \times 10^{11}$ | −35~5 |

TABLE 4

| Example | Grain size (μm) | Relative density (%) | Nominal permittivity (@ 1 kHz) $\varepsilon_r$ | tanδ | $\varepsilon_0$ (@ 1 kHz) | $\varepsilon$ (@ 1 kHz) | $\Delta\varepsilon/\varepsilon_0 \times 100$ (%) | Specific resistivity (ρ) (Ωcm) | Temperature characteristic TCC (%) |
|---|---|---|---|---|---|---|---|---|---|
| Reference Example 1 | 1.2 | >99 | 760 | 0.8 | 760 | 566 | 25.5 | $1.7 \times 10^{12}$ | −5~4 |
| Reference Example 2 | 0.96 | >99 | 669 | 1.3 | 585 | 492 | 15.9 | $9.9 \times 10^{11}$ | −10~15 |
| Comparative Reference Example 6 | 1.0 | >99 | 442 | 1.6 | 415 | 367 | 11.6 | $5.5 \times 10^{11}$ | −10~67 |

TABLE 4-continued

| Example | Grain size (μm) | Relative density (%) | Nominal permittivity (@ 1 kHz) $\varepsilon_r$ | tanδ | $\varepsilon_0$ (@ 1 kHz) | $\varepsilon$ (@ 1 kHz) | $\Delta\varepsilon/\varepsilon_0 \times 100$ (%) | Specific resistivity (ρ) (Ωcm) | Temperature characteristic TCC (%) |
|---|---|---|---|---|---|---|---|---|---|
| Comparative Reference Example 7 | 1.3 | >99 | 1.105 | 0.6 | 1,225 | 968 | 21.0 | $1.2 \times 10^{12}$ | −36~14 |
| Comparative Reference Example 8 | 1.3 | >99 | 741 | 0.3 | 839 | 671 | 20.0 | $1.9 \times 10^{12}$ | −28~14 |

Referring to Table 3, the nominal permittivity (ε) and the vacuum permittivity ($\varepsilon_0$) at 1 kHz of the NaNbO$_3$ binary dielectric material of Reference Example 1 in which Sm was substituted into the Na site of NaNbO$_3$ were 760, and a specific resistivity (ρ) thereof was $1.7 \times 10^{12}$ Ωcm. In comparison, the nominal permittivity ($\varepsilon_r$) and the vacuum permittivity ($\varepsilon_0$) at 1 kHz of the NaNbO$_3$ binary dielectric material of Comparative Reference Example 3 in which La was substituted into the Na site of NaNbO$_3$ were as low as 411 and 495, respectively. The specific resistivities (ρ) of the NaNbO$_3$ binary dielectric materials of Comparative Reference Example 2 to Comparative Reference Example 5 in which Y, La, Yb, and Dy were respectively substituted into the Na site of NaNbO$_3$ were as low as $8.0 \times 10^{11}$ Ωcm, $5.7 \times 10^{11}$ Ωcm, $6.5 \times 10^{11}$ Ωcm, and $4.4 \times 10^{11}$ Ωcm, respectively. The nominal permittivity (tan δ) at 1 kHz of NaNbO$_3$ binary dielectric material of Reference Example 1 was 0.8. In comparison, the nominal permittivities (tan δ) of the NaNbO$_3$ binary dielectric materials of Comparative Reference Examples 1, 2, 4, and 5 in which Gd, Y, Yb, and Dy were respectively substituted into the Na site of NaNbO$_3$ were relatively high at 1.2, 1.9, 1.6, and 1.8, respectively.

Referring to Table 3 and FIG. 2, for the NaNbO$_3$ binary dielectric material of Reference Example 1, the temperature characteristic (TCC) in the range of −55° C. to +200° C. was stable at −5% to 4%. In comparison to this, the temperature characteristics (TCC) in the range of −55° C. to +200° C. of the NaNbO$_3$ binary dielectric materials of Comparative Reference Examples 1 to 5 were relatively unstable at −22% to 0%, −27% to 14%, −4% to 31%, −32% to 3%, and −35% to 5%, respectively.

From these results, it can be confirmed that the NaNbO$_3$ binary dielectric material of Reference Example 1 in which Sm was substituted at Na site of NaNbO$_3$ had excellent dielectric characteristic and specific resistivity characteristic and stable temperature characteristic (TCC), compared to the NaNbO$_3$ binary dielectric materials of Comparative Reference Example 1 to Comparative Reference Example 5.

Referring to Table 4, the NaNbO$_3$ binary dielectric materials of Reference Example 1 and Reference Example 2 in which 0.10 mol % and 0.15 mol % of Sm were respectively substituted into the Na site of NaNbO$_3$ had higher nominal permittivity (ε) and vacuum permittivity ($\varepsilon_0$) than those of the NaNbO$_3$ binary dielectric material of Comparative Reference Example 6 in which 0.05 mol % of Sm was substituted into the Na site of NaNbO$_3$. The NaNbO$_3$ binary dielectric material of Reference Example 1 had a higher specific resistivity (ρ) than that of the NaNbO$_3$ binary dielectric material of Comparative Reference Example 6.

The temperature characteristics (TCC) in the range of −55° C. to +200° C. of the NaNbO$_3$ binary dielectric materials of Reference Example 1 and Reference Example 2 were stable at −5% to 4% and −10% to 15%, respectively.

In comparison, the temperature characteristics (TCC) in the range of −55° C. to +200° C. of the NaNbO$_3$ binary dielectric materials of Comparative Reference Examples 6 to 8 in which 0.05 mol %, 0.20 mol %, and 0.25 mol % of Sm were respectively substituted into the Na site of NaNbO$_3$ were relatively unstable, at −10% to 67%, −36% to 14%, and −28% to 14%, respectively.

From these results, it can be confirmed that the NaNbO$_3$ binary dielectric materials of Reference Example 1 and Reference Example 2 in which 0.10 mol % and 0.15 mol % of Sm were respectively substituted at Na site of NaNbO$_3$ had excellent dielectric characteristic and stable temperature characteristic (TCC), compared to the NaNbO$_3$ binary dielectric materials of Comparative Reference Example 6 to Comparative Reference Example 8.

Evaluation Example 3: Dielectric characteristic and temperature characteristic of NaNbO$_3$ ternary dielectric material.

Figure 3:
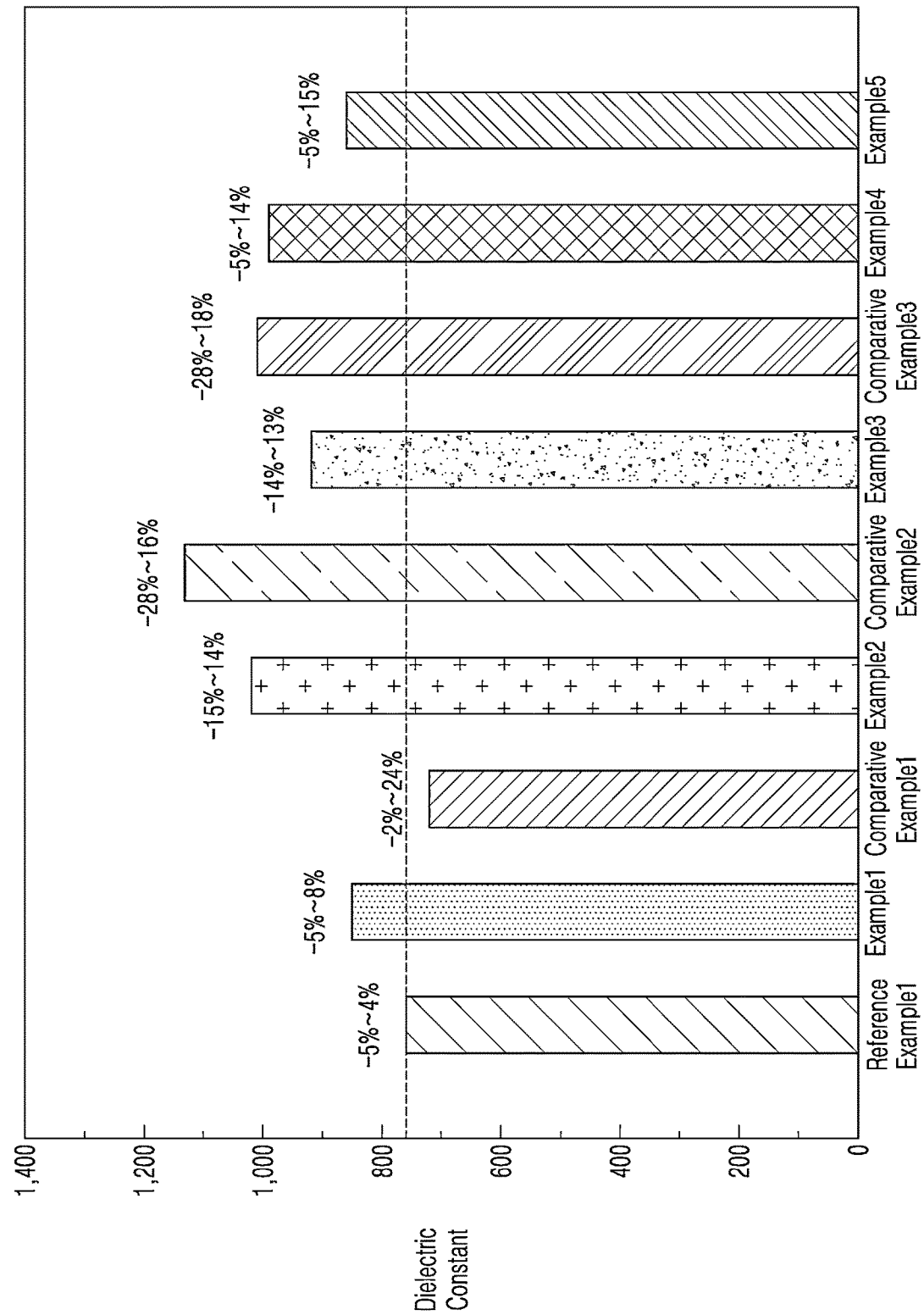
FIG. 3 shows results showing dielectric constants and temperature characteristics of the $NaNbO_3$ binary dielectric materials or $NaNbO_3$ ternary dielectric materials of Reference Example 1, Examples 1 to 5, and Comparative Examples 1 to 3.

The dielectric characteristics and temperature characteristics of the NaNbO$_3$ ternary dielectric materials of Examples 1 to Example 5 and Comparative Examples 1 to Comparative Example 3 were evaluated using the same methods as applied to the evaluation of effective permittivity (ε), nominal permittivity (tan δ), and temperature characteristic in Evaluation Example 2. The results are shown in Table 5 and FIG. 3. FIG. 3 shows results showing dielectric constants and temperature characteristics of the NaNbO$_3$ binary dielectric materials or NaNbO$_3$ ternary dielectric materials of Reference Example 1, Examples 1 to 5, and Comparative Examples 1 to 3.

TABLE 5

| | ε (@ 1 kHz) | Nominal permittivity(@ 1 kHz) (tanδ) | Temperature characteristic (TCC, %) |
|---|---|---|---|
| Example 1 | 850 | 0.8 | −5~8 |
| Example 2 | 1,020 | 1.5 | −15~14 |
| Example 3 | 920 | 0.8 | −14~13 |
| Example 4 | 990 | 1.4 | −5~14 |
| Example 5 | 860 | 1.7 | −5~15 |
| Comparative Example 1 | 720 | 0.5 | −2~24 |
| Comparative Example 2 | 1,130 | 2.1 | −28~16 |
| Comparative Example 3 | 1,010 | 0.6 | −28~18 |

Referring to Table 5 and FIG. 3, the NaNbO$_3$ ternary dielectric materials of Examples 1 to 5 had an excellent effective permittivity (ε) of 850 or more, and a stable temperature characteristic (TCC) at −15% to 15%. In comparison, the temperature characteristics (TCC) of the NaNbO$_3$ ternary dielectric materials of Comparative Example 1 to Comparative Example 3 were relatively unstable. In addition, the nominal permittivity (tan δ) of the NaNbO$_3$ ternary dielectric material of Comparative Example 2 was higher, compared to the NaNbO$_3$ ternary dielectric materials of Examples 1 to 5.

From these results, it can be confirmed that the NaNbO$_3$ ternary dielectric materials of Example 1 to Example 5 had excellent dielectric characteristic and stable temperature characteristic (TCC).

As described above, according to the one or more embodiments, the dielectric material may include a NaNbO$_3$ ternary material having a permittivity (ε) of 600 or larger at 1 kHz, and a temperature coefficient of capacitance (TCC), expressed by Equation 1, of about −15% to about 15% in a range of about −55° C. to about +200° C. The NaNbO$_3$ ternary material may include a perovskite phase with a Sm element substituted into Na site. The dielectric material may be applied to high-temperature MLCCs for vehicles or special purposes, and also operate in a high-electric field region, and thus a device with high efficiency in accordance with thinning of the dielectric layer may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A dielectric material, comprising:
a NaNbO$_3$ ternary material including a perovskite phase with a Sm element substituted into a Na site such that the NaNbO$_3$ ternary material has a permittivity of 600 or more at 1 kHz, and a temperature coefficient of capacitance (TCC) of about −15% to about 15% in a range of about −55° C. to about +200° C.

2. The dielectric material of claim 1, wherein a specific resistivity of the NaNbO$_3$ ternary material is greater than 1×10$^{12}$ Ωcm.

3. The dielectric material of claim 1, wherein a dielectric loss factor (tan δ) of the NaNbO$_3$ ternary material is 2.0 or less.

4. The dielectric material of claim 1, wherein the NaNbO$_3$ ternary material comprises a compound represented by Formula 1:

(1−x−y)NaNbO$_3$−xSm$_{1/3}$NbO$_3$−y(M1)$_a$(M2)$_b$O$_3$  [Formula 1]

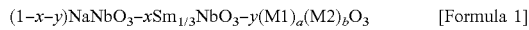

wherein,
M1 is a Group 1 element, a Group 2 element, Group 15 element, or a combination thereof,
M2 is a Group 4 transition metal element, a Group 5 transition metal element, or a combination thereof, and
0.1≤x≤0.15, 0.001≤y≤0.1, 0<a<1, 0<b<1, and a+b=1.

5. The dielectric material of claim 4, wherein NaNbO$_3$ and Sm$_{1/3}$NbO$_3$ in the compound form a solid solution.

6. The dielectric material of claim 1, wherein the NaNbO$_3$ ternary material comprises a compound represented by Formula 2:

(1−x−y)NaNbO$_3$−xSm$_{1/3}$NbO$_3$−y(M1)$_c$(M1')$_d$TiO$_3$  [Formula 2]

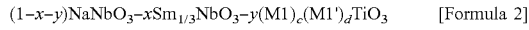

wherein,
M1 and M1' are each independently a Group 1 element, a Group 2 element, a Group 15 element, or a combination thereof, and
0.1≤x≤0.15, 0.001≤y≤0.03, 0<c<1, 0<d<1, and c+d=1.

7. The dielectric material of claim 6, wherein M1 and M1' in Formula 2 are each independently Ba, Sir, Ca, Na, Bi, or a combination thereof.

8. The dielectric material of claim 6, wherein 0.001≤y≤0.02.

9. The dielectric material of claim 1, wherein the NaNbO$_3$ ternary material comprises a compound represented by Formula 3:

(1−x−y)NaNbO$_3$−xSm$_{1/3}$NbO$_3$−y(M1)TaO$_3$  [Formula 3]

wherein,
M1 is a Group 1 element, and
0.1≤x≤0.15, and 0.001≤y≤0.1.

10. The dielectric material of claim 9, wherein, M1 is Na.

11. The dielectric material of claim 9, wherein, 0.001≤y≤0.1.

12. The dielectric material of claim 1, wherein the NaNbO$_3$ ternary material comprises at least one of (1−x−y)NaNbO$_3$−xSm$_{1/3}$NbO$_3$−yBaTiO$_3$, (1−x−y)NaNbO$_3$−xSm$_{1/3}$NbO$_3$−ySrTiO$_3$, (1−x−y)NaNbO$_3$−xSm$_{1/3}$NbO$_3$−yCaTiO$_3$, (1−x−y)NaNbO$_3$−xSm$_{1/3}$NbO$_3$−yBicNadTiO$_3$, or (1−x−y)NaNbO$_3$−xSm$_{1/3}$NbO$_3$−y'NaTaO$_3$,
wherein x is from 0.1 to 0.15, y is from 0.001 to 0.03, y' is from 0.001 to 0.1, c and d are each independently greater than 0 and less than 1, and the sum of c and d is 1.

13. The dielectric material of claim 1, wherein the NaNbO$_3$ ternary material comprises at least one of (0.85−y)NaNbO$_3$−0.15Sm$_{1/3}$NbO$_3$−yBaTiO$_3$, (0.85−y)NaNbO$_3$−0.15Sm$_{1/3}$NbO$_3$−ySrTiO$_3$, (0.85−y)NaNbO$_3$−0.15Sm$_{1/3}$NbO$_3$−yCaTiO$_3$, (0.85−y)NaNbO$_3$−0.15Sm$_{1/3}$NbO$_3$−yBicNadTiO$_3$, and (0.85−y)NaNbO$_3$−0.15Sm$_{1/3}$NbO$_3$−y'NaTaO$_3$,
wherein y is from 0.001 to 0.03, y' is from 0.001 to 0.1, c and d are each independently greater than 0 and less than 1, and the sum of c and d is 1.

14. A device comprising:
a first electrode;
a second electrode facing the first electrode; and
a dielectric layer between the first electrode and the second electrode;
wherein the dielectric layer includes the dielectric material according to claim 1.

15. The dielectric material of claim 14, wherein the dielectric layer is a single layer.

16. The dielectric material of claim 14, wherein the dielectric layer is a multilayer of at least two layers.

17. The dielectric material of claim 14, further comprising a protective layer on at least a portion of at least one of an upper portion or a lower portion of the dielectric layer.

18. The device of claim 17, wherein the protective layer is a single layer.

19. The device of claim 17, wherein the protective layer is a multilayer of at least two layers.

20. The device of claim 17, wherein the protective layer comprises BaTiO$_3$, SrTiO$_3$, BaZrO$_3$, BaTiO$_3$, PbTiO$_3$, PbZrO$_3$, SrZrO$_3$, CaTiO$_3$, CaZrO$_3$, BaSnO$_3$, BaFeO$_3$, or a combination thereof.

21. The device of claim 14, wherein the device is a capacitor.

22. A device of comprising:
a plurality of internal electrodes including a plurality of first electrodes and a plurality of second electrodes alternately arranged; and
dielectric layers between the plurality of first electrodes and the plurality of second electrodes, respectively,
wherein at least one of the dielectric layers includes the dielectric material according to claim 1.

23. A method of preparing a dielectric material, the method comprising:
mechanically milling a mixture of a Nb compound, a Na salt, a Sm compound, an M1-containing salt, and an M2-containing salt; and
performing a first heat treatment in an oxidizing atmosphere such that the mixture oxidizes to form the dielectric material including a compound represented by Formula 1:

$$(1-x-y)NaNbO_3 - xSm_{1/3}NbO_3 - y(M1)_a(M2)_bO_3 \quad \text{[Formula 1]}$$

wherein,
M1 is a Group 1 element, a Group 2 element, a Group 15 element, or a combination thereof,
M2 is a Group 4 transition metal element, a Group 5 transition metal element, or a combination thereof, and
$0.1 \leq x \leq 0.15$, $0.001 \leq y \leq 0.1$, $0 < a < 1$, $0 < b < 1$, and $a+b=1$.

24. The method of claim 23, wherein the first heat treatment is performed at about 800° C. to about 1000° C.

25. The method of claim 23, further comprising:
obtaining a molded body using a product of the first heat treatment; and
performing a second heat treatment on the molded body.

26. The method of claim 25, wherein the second heat treatment is performed at about 1000° C. to about 1600° C.

* * * * *